(12) United States Patent
Haelvoet

(10) Patent No.: US 11,782,502 B2
(45) Date of Patent: Oct. 10, 2023

(54) HEAD TRACKING SYSTEM

(71) Applicant: PSS BELGIUM NV, Dendermonde (DE)

(72) Inventor: Tom Haelvoet, Ghent (BE)

(73) Assignee: PSS BELGIUM NV, Dendermonde (BE)

( * ) Notice: Subject to any disclaimer, the term of this patent is extended or adjusted under 35 U.S.C. 154(b) by 0 days.

(21) Appl. No.: 17/772,827

(22) PCT Filed: Nov. 2, 2020

(86) PCT No.: PCT/EP2020/080630
§ 371 (c)(1),
(2) Date: Apr. 28, 2022

(87) PCT Pub. No.: WO2021/089454
PCT Pub. Date: May 14, 2021

(65) Prior Publication Data
US 2022/0404905 A1    Dec. 22, 2022

(30) Foreign Application Priority Data
Nov. 5, 2019 (GB) ..................................... 1916055

(51) Int. Cl.
*G06F 3/01* (2006.01)
*G06V 10/141* (2022.01)
(Continued)

(52) U.S. Cl.
CPC ............ *G06F 3/012* (2013.01); *G06F 3/0304* (2013.01); *G06V 10/141* (2022.01); *G06V 10/60* (2022.01);
(Continued)

(58) Field of Classification Search
CPC ...... G06F 3/012; G06F 3/0304; G06V 10/141; G06V 10/60; G06V 20/46; H04R 5/023;
(Continued)

(56) References Cited

U.S. PATENT DOCUMENTS 6,243,476 B1    6/2001   Gardner
8,331,614 B2   12/2012   Mannerheim et al.
(Continued)

FOREIGN PATENT DOCUMENTS

EP    2389016 A1    11/2011
EP    3419309 A1    12/2018

OTHER PUBLICATIONS

Search Report from corresponding Great Britain Application No. GB1916055.5, dated Apr. 27, 2020.
International Search Report and Written Opinion from corresponding PCT Application No. PCT/EP2020/080630, dated Feb. 4, 2021.

*Primary Examiner* — Premal R Patel
(74) *Attorney, Agent, or Firm* — WORKMAN NYDEGGER

(57) ABSTRACT

A head tracking system for use in a headrest, includes at least one optical circuit having a plurality of sensors. Each sensor arranged to detect light reflected from at least portion of an illuminated scene. The portion of the scene contains at least a part of a head to be tracked, and to provides an output signal corresponding to an amount of reflected light detected by the sensor. An acquisition circuit is arranged to receive a plurality of output signals from the plurality of sensors and to derive a frame from said output signals. A processing unit is arranged to receive the frame and to derive an indication of a change in position and/or orientation of the head by comparing the received frame with one or more frames obtained at different moments in time.

14 Claims, 4 Drawing Sheets

(51) Int. Cl.
*G06V 20/40* (2022.01)
*G06V 10/60* (2022.01)
*G06F 3/03* (2006.01)
*H04R 5/02* (2006.01)
*H04S 7/00* (2006.01)

(52) U.S. Cl.
CPC ............ *G06V 20/46* (2022.01); *H04R 5/023* (2013.01); *H04S 7/303* (2013.01); *H04R 2499/13* (2013.01); *H04S 2420/01* (2013.01)

(58) Field of Classification Search
CPC ..... H04R 2499/13; H04R 1/028; H04S 7/303; H04S 2420/01
See application file for complete search history.

(56) References Cited

U.S. PATENT DOCUMENTS

| | | | |
|---|---|---|---|
| 9,811,916 B1* | 11/2017 | Khokhlov | G06T 7/246 |
| 2006/0045294 A1 | 3/2006 | Smyth | |
| 2008/0144944 A1 | 6/2008 | Breed | |
| 2012/0170800 A1* | 7/2012 | da Silva Frazao | G06T 19/006 |
| | | | 382/103 |
| 2013/0121515 A1* | 5/2013 | Hooley | H04R 1/403 |
| | | | 381/300 |
| 2016/0329040 A1 | 11/2016 | Whinnery | |
| 2018/0329484 A1* | 11/2018 | Steedly | G02B 27/017 |
| 2018/0334102 A1* | 11/2018 | Zafeirakis | B60R 1/00 |

* cited by examiner

HEAD TRACKING SYSTEM

FIELD OF THE INVENTION

The present invention is generally related to the field of systems for head tracking, more in particular for tracking movement of the head of a person seated in a vehicle.

BACKGROUND OF THE INVENTION

Head tracking systems for acoustic virtualization are known in the art. With acoustic virtualization is meant that abstraction is made of the physical resources that produce sound by considering logical units that altogether perform the same functionality as the physical resources. Various acoustic virtualization algorithms have been developed which create an illusion of sound sources being located at a specific distance and in a specific direction. Typically, these algorithms have an objective to approximate a transfer function of the sound sources (e.g. in case of stereo audio, two loudspeakers in front of the user) to the human ears. A fixed virtualization is however not sufficient, as human directional perception appears to be very sensitive to head movements. This is how head tracking and head tracking systems have come into play.

In a head tracking system the head position and/or orientation is measured. From these measurements head movement is detected and the virtualization is adapted to the new head position. Nowadays a multitude of head tracking systems based on various technologies is available.

In some of the conventional systems the head tracking is integrated into the headset. Various types of motion tracking can be applied in such systems, e.g. an accelerometer, a gyroscope, compass. Such systems however may create wearing fatigue and cause discomfort. In some implementations an additional cable to the user may be needed. In other implementations the data transmission may be wireless but additional power supply may be required.

Other known head tracking systems rely on the use of a front camera. Such a camera tracker can be used for head detection, but also for feature detection and/or feature tracking. Also this type of head tracking suffers from several drawbacks. It may be that the position is not always available. The front camera may be positioned in the field of view, which may distract the user. It may happen that the head is not at any moment in time visible (e.g. because a seated user swivels away). Further, a significant amount of image processing power may be required to process the received images.

An example of a camera based head tracking system can be found in U.S. Pat. No. 8,331,614, where face images of a listener are obtained and next the skin colour of an image is tracked, thereby obtaining an indication of the listener's position. Via triangulation the distance between camera and user can then be determined.

US2006/045294 deals with personalized headphone virtualization, that aims to let a listener experience the sound of virtual loudspeakers over headphones with a level of realism comparable to a real loudspeaker experience. Personalized room impulse responses are acquired for the loudspeaker sound sources over a small number of listener head positions. The responses are used to transform an audio signal for the loudspeakers into a virtualized output for the headphones. Basing the transformation on the listener's head position, the system can adjust the transformation so that the virtual loudspeakers appear not to move as the listener moves the head.

There is a need for an improved head tracking system that can be used in a flexible way.

SUMMARY OF THE INVENTION

It is an object of embodiments of the present invention to provide for a head tracking system that is user friendly in the sense that hindrance due to the presence of wearables and/or front cameras is avoided. It is a further object to provide a headrest equipped with such a head tracking system and a seat comprising such a headrest.

The above objective is accomplished by the solution according to the present invention.

In a first aspect the invention relates to a head tracking system suitable for use in a headrest. The head tracking system comprises
  at least one optical circuit comprising a plurality of sensors, each sensor arranged to detect light reflected from at least portion of an illuminated scene, said portion of said scene containing at least a part of a head to be tracked, and to provide an output signal corresponding to an amount of reflected light detected by the sensor,
  an acquisition circuit arranged to receive a plurality of output signals from said plurality of sensors and to derive a frame from said output signals, and
  a processing unit arranged to receive said frame and to derive an indication of a change in position and/or orientation of the head by comparing said received frame with one or more frames obtained at different moments in time.

The proposed solution indeed allows for keeping track of the head. A portion of a scene comprising at least a part of the head to be tracked is illuminated by daylight and/or by a light source. The reflected light is detected by a set of sensors which each convert a received signal into an electrical signal. The latter signals are fed to an acquisition circuit wherein a frame is derived, which is next processed to determine whether or not there has been head movement. The decision on a change in position and/or orientation of the head is taken based on a comparison of frames obtained at different time instants, e.g. the received frame and the preceding frame, i.e. two consecutively obtained frames. The illuminated part of the head to be tracked is preferably the back half of the head or a part thereof. This implies the sensed image is taken from behind the head or from the side of the head. It is therefore an advantage of the proposed head tracking system that the user is not hindered by any wearable or by wires as in prior art solutions. It is also an advantage that the computational load to derive the indication of any head movement in the processing unit is limited, so that no costly processor is needed. Another asset of the proposed head tracking system is the fact that the set-up is so that there is a scene available comprising the head or at least a part thereof, so that it is possible to track the head in a continuous or quasi-continuous fashion.

In a preferred embodiment the processing unit is arranged to derive said indication by calculating translation between the received frame and the one or more frames used to perform the comparison with and the indication comprises one or more displacement vectors.

In advantageous embodiments the plurality of sensors is so arranged that it forms a two-dimensional array. This offers the benefit of yielding two-dimensional displacement vectors. Using two-dimensional sensor arrays further also leads to a cost-efficient implementation.

In a preferred embodiment the head tracking system comprises a light source to illuminate at least said portion of the scene. This yields as advantage that the head tracking system can also be used when it is dark or when the available daylight is not enough to obtain a sufficient amount of reflected light. In some embodiments the intensity and/or one or more wavelengths of light emitted by the light source can be adapted.

In embodiments the one or more wavelengths emitted by the light source are in the infrared light spectrum.

In an aspect the invention relates to a system comprising a head tracking system as previously described and at least two loudspeakers. The system is arranged to adjust at least one parameter setting of signals applied to the loudspeakers based on the indication of the change in position and/or orientation of the head.

In preferred embodiments the system is arranged to adjust in magnitude and/or phase and/or delay the signals applied to the loudspeakers.

In another aspect the invention relates to a headrest equipped with a head tracking system as previously described. The headrest with the optical circuit of the head tracking system built in offers the advantage that there is constantly a scene available comprising the head or a part of the head when the headrest is employed. Due to this positioning in the headrest the head remains visible while the system is in use. Again it can be noted that the user cannot be distracted by the presence of the head tracking system, which is completely outside the user's field of view. Also the processing unit can be placed in the headrest.

In one embodiment there is an optical circuit of the head tracking system positioned right behind the user's head, so as to face the back of the head.

In one embodiment an optical circuit of the at least one optical circuit is so positioned that it faces an ear of a user.

In a preferred embodiment the headrest further comprises at least two loudspeakers and arranged to adjust at least one parameter setting of said loudspeakers based on said indication of said change in position and/or orientation of the head.

In another embodiment the processing unit is arranged for calculating the at least one parameter setting to be adjusted.

Advantageously, the headrest is arranged to detect that the total amount of reflected light captured by the sensors drops below a given threshold level.

In yet another aspect the invention relates to a seat comprising a headrest as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
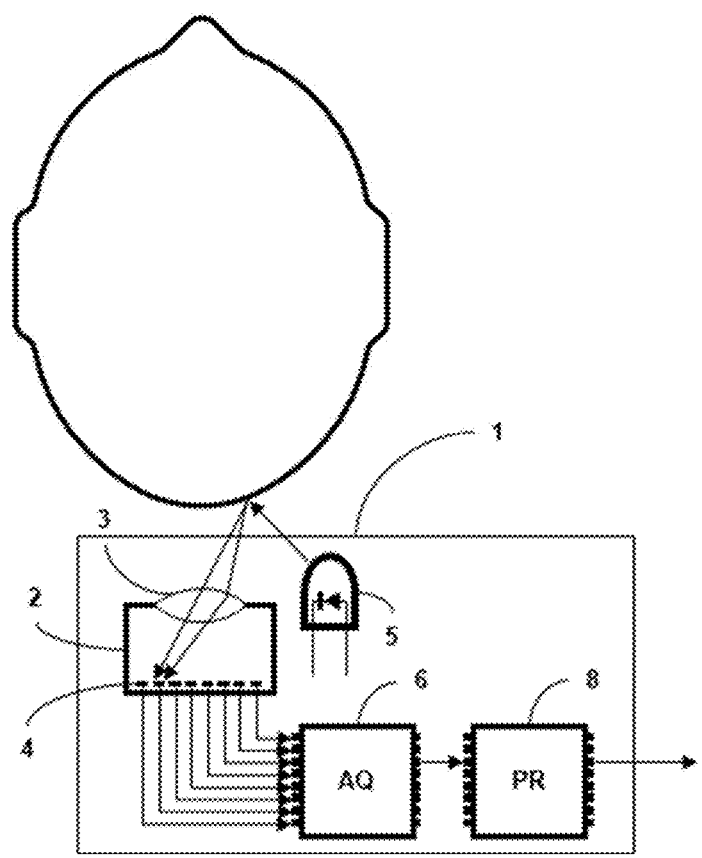
FIG. 1 illustrates an embodiment of the head tracking system according to the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes in a first aspect a head tracking system wherein no wearable (e.g. a headset) or a physical connection with the user is needed. The solution according to the invention requires only lightweight processing which can easily be embedded in e.g. a digital signal processor.

In embodiments of the invention a head tracking system is disclosed comprising one or more optical circuits, an acquisition unit and a processing unit. In one embodiment daylight is used to illuminate a scene, or at least a portion thereof, comprising a head to be tracked. In other embodiments the at least one optical circuit comprises a light source to illuminate the scene of interest. One possible implementation of such an embodiment of the head tracking system (1) is illustrated in FIG. 1 which comprises a single optical circuit (2). The optical circuit of the head tracking system comprises in the shown embodiment a light source (5). The light source is so positioned that a scene is illuminated comprising a person's head to be tracked or at least a part of the head, e.g. a part of the back of the head or the side of the head or a part thereof. In any case the scene so comprises at least a part of the back half of the head. Note that in this description the words 'user', 'person' and 'listener' are used interchangeably in relation to the head to be tracked. In preferred embodiments the light source is so positioned that at least a part of the back half of the head of a person is illuminated. In another embodiment a side view of the head comprising one of the person's ears can be illuminated with a single optical circuit. In a specific embodiment the light source may be arranged to trace a portion of the head.

The light outputted by the light source may be visible light or may be light in the invisible part of the spectrum, e.g. infrared light. For example, an infrared light emitting diode (LED) can be used as light source in certain embodiments. The light may then contain one or more wavelengths in the range of 650 to 1000 nm. If visible light is made use of, one can opt for light of one specific wavelength, so for a specific colour, e.g. blue or green, or for light comprising a range of wavelengths or various specifically selected wavelengths. In some embodiments the intensity and/or one or more wavelengths of the light emitted by the light source of the head tracking system can be adapted. The wavelengths can be selected in function of the environmental circumstances at hand, e.g. based on the intensity of the light captured by the sensors. However, as already mentioned, in one embodiment of the system there is no light source present and daylight and/or environmental light (e.g. coming from one or more sources already present in the facilities) is used to illuminate the scene.

The light reflected by the head is focussed through a lens (3) and then reaches a plurality of sensors (4). Each sensor detects an amount of reflected light and accordingly converts this physical quantity into an analogue electrical output signal corresponding to the amount of reflected light detected by the sensor. The output signal is for example a voltage signal. The magnitude of the voltage signal of each sensor corresponds to the amount of reflected light captured by that sensor.

In an embodiment the sensors are aligned to form a one-dimensional array. If the sensors are aligned e.g. in a given direction, for example horizontal direction, then the sensors can be used for tracking movement of the head in that given direction. Advantageously the aligned sensors are equally spaced, so that meaningful displacement vectors can be obtained. In other embodiments the multitude of sensors forms a two-dimensional array.

The sensors may in some embodiments be photosensors, i.e. electronic components to detect the presence of visible light, infrared light or ultraviolet (UV) light. The photosensors may be part of a charge coupled device (CCD). As well known in the art, CCDs are light-sensitive integrated circuits wherein the light sensitive sensors record the amount of radiation incident on the sensors.

Each sensor output is connected to an input of an acquisition circuit, which in certain embodiments can be integrated in the processing unit. The acquisition circuit receives from the various sensors outputted electrical signals, e.g. voltage signals, which are A/D (analogue-to-digital) converted. From the digitized electrical signals a frame is derived.

Embodiments of the acquisition circuit that derives the frame may be implemented as follows. The incoming voltage signals may first be filtered with an analogue low-pass filter, e.g. a filter with a cut-off frequency of 50 Hz. Next the signals are applied to an analogue-to-digital converter, which samples the applied voltage signals at a given sample rate, e.g. 100 Hz, and with a given resolution, e.g. 8 bits per sample. The obtained samples are then arranged in a frame of given dimensions. Preferably the dimensions of the frame correspond to the configuration of the plurality of sensors. For example, in the above-mentioned case of a set of N aligned sensors (with N an integer value), the frame has dimensions Nx1. Depending on the rate at which frames are provided to the processing unit, the movement of the head can be tracked in a virtually continuous way or quasi-continuously, i.e. with short interruptions.

The obtained frame can be considered to represent a state observed by the acquisition circuit at a given time instant. The various frames (or otherwise stated the states) collected over time are stored in a memory. The memory may in certain embodiments be a stand-alone memory. In other embodiments the memory may be part of the processing unit (8) or of the acquisition circuit (6).

Frames stored in the memory are processed to determine a displacement vector. An advantageous way to do so, is by applying frames to a digital correlation algorithm that is run in the processing unit to calculate the displacement vector.

Examples of such digital correlation algorithms are well known in the art, as the concept of using cross-correlation to measure shifts in datasets has been known and applied for a long time. The calculation step is repeated at a certain rate, in preferred embodiments at the same rate that the frames of sampled values are obtained. So, in the example with a sample rate of 100 Hz, 100 pairs of frames per second would be fed to the correlation algorithm, resulting in a stream of 100 displacement vectors per second.

Figure 2:
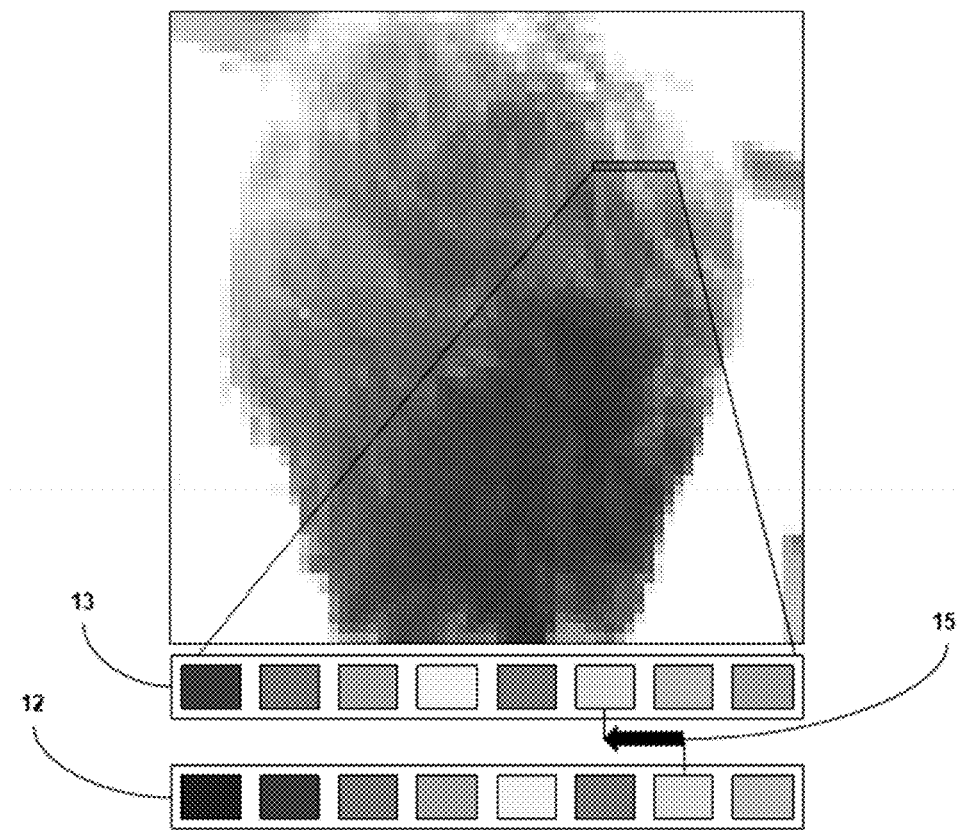
FIG. 2 illustrates the determination of a displacement vector by comparison of two frames obtained at different instants of time.

An example is provided in FIG. 2. FIG. 2 shows a new frame (13) being obtained and stored in a storage means, that already contains an earlier frame (12) with which the new frame is compared. By this comparison one obtains an indication that a translation has occurred between the two frames and hence yields a non-zero displacement vector (15).

In an embodiment with a two-dimensional array of sensors, say a MxN sensor matrix, again each sensor outputs an analogue electrical signal (e.g. a voltage signal). The acquisition circuit receives the various electrical signals and derives a frame, which is now also two-dimensional and contains M rows and N columns. The algorithms then performs a two-dimensional correlation to determine the displacement vectors. Using two-dimensional array of sensors offers the advantage of obtaining a cost efficient solution.

One of the major advantages of the proposed system is that the computational load required to determine whether or not there has been any movement of the head is moderate. This limits the computational requirements imposed on the processing unit. For example, in certain implementations a computational load below 2 MIPS may be feasible dependent on the required accuracy. Note, however, that for applications demanding increased accuracy, larger computational loads may be necessary. In preferred embodiments the processing unit is implemented as a "simple" digital signal processor.

To explain how an indication of the change in position and/or orientation of the head is derived, some examples are provided.

Figure 3:
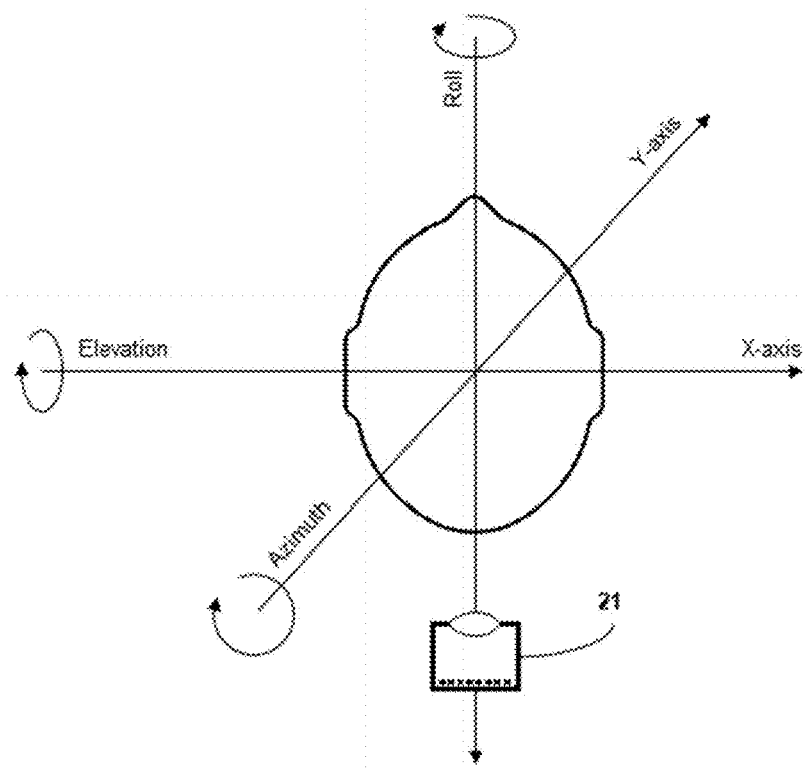
FIG. 3 illustrates the derivation of an indication of a head movement in an embodiment of a head tracking system with one optical circuit.

First an embodiment is considered with only one optical circuit and a two-dimensional array of sensors. The optical circuit is so positioned that it faces the back of the head of the user. FIG. 3 provides an illustration. The circuit (21) is positioned in the XZ-plane in FIG. 3. The head has six degrees of freedom to move in a three-dimensional space. Indeed, the head is free to move forward/backward, up/down, left/right (translation in three perpendicular axes) combined with rotation about three perpendicular axes, often termed elevation (or pitch), azimuth (also named yaw) and roll, respectively. It is clear that in this embodiment with only one optical circuit it is not possible to deal with all possible types of movement and rotation. However, it was found that the user often moves the head only around the elevation axis (up/down) and the azimuth axis (left/right). Hence, in practice an embodiment with one optical circuit is an important use case. If in the processing unit after analysis of frames obtained at different moments in time (e.g. two consecutive frames) a non-zero displacement vector is found and, hence, it can be concluded that there has been movement, this displacement can directly be related to a change in head orientation. In case of a displacement in left-right direction, it can be assumed that there has been a rotation of the head around the azimuth axis. In case a displacement in up-down direction, a rotation around the elevation axis has occurred.

Figure 4:
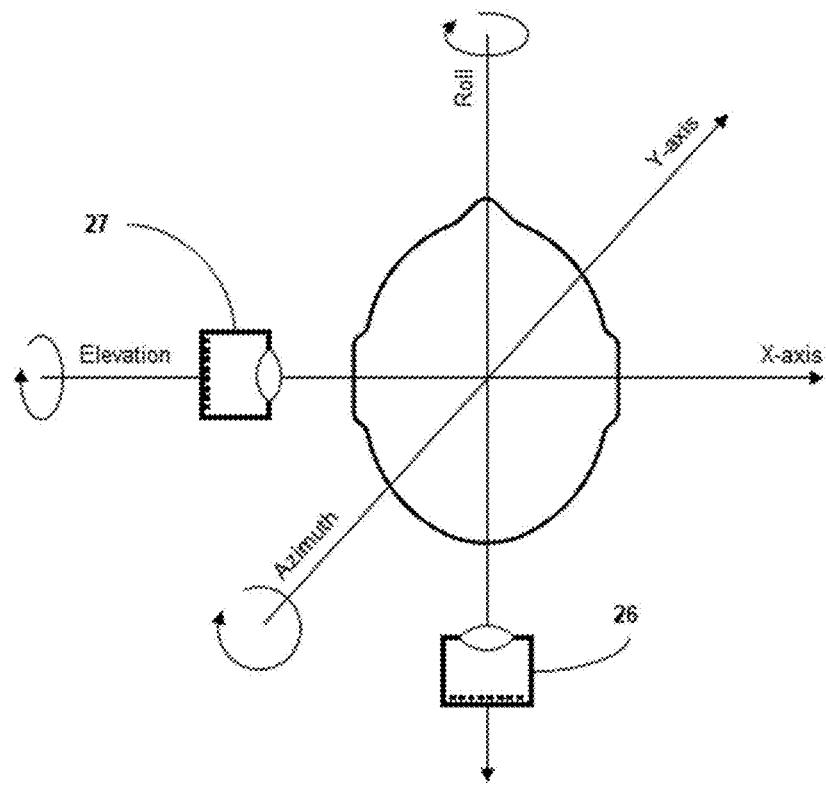
FIG. 4 illustrates the derivation of an indication of a head movement in an embodiment of a head tracking system with two optical circuits.

Another embodiment is now considered wherein two optical circuits are present (see FIG. 4) and wherein two-dimensional sensor arrays are applied. Just as in the previous example, again one optical circuit (26) is placed in the XZ plane and faces the back of the head of the person. A second optical circuit (27) is placed also in the same XZ-plane and faces in this particular example the user's left ear. The processing unit receives input signals (frames) from both acquisition circuits. For each optical circuit a displacement vector can be determined by comparing frames obtained at different moments in time. Combining the information concerning displacement of the two circuits then provides an indication of the head movement. The displacement vectors may be combined, for example using a weighted sum or a two-dimensional look-up table or a Kalman filter.

For example, in case both optical circuit 1 at the back of the head and optical circuit 2 in front of the left ear either detect no movement (denoted 'no' in the scheme below) or a movement in up-down direction (denoted $\Delta\updownarrow$), the available options can be summarized in the following scheme:

|  | Optical Circuit 1 | |
| --- | --- | --- |
|  | no | $\Delta\updownarrow$ |
| Optical Circuit 2    no | no | $\Delta$elevation |
| $\Delta\updownarrow$ | $\Delta$roll | $\Delta Y$ |

Obviously, if none of the optical circuits detects any displacement, the head has not moved. In case only optical circuit 1 detects an up/down movement while optical circuit 2 does not observe any movement, it can be concluded that there has been a head rotation around the elevation axis. In case only optical circuit 2 detects an up/down displacement while optical circuit 1 does not observe any displacement at all, a head movement along the roll axis (i.e. the Z-axis) can be assumed. If an up/down displacement is observed by both optical circuit 1 and optical circuit 1, there has been a translation of the head along the Y-axis.

Similarly, in case both optical circuit 1 at the back of the head and optical circuit 2 in front of the left ear either detect no movement (denoted 'no' in the scheme below) or a movement in left-right direction (denoted $\Delta\leftrightarrow$), the available options can be summarized as follows:

|  | Optical Circuit 1 | |
| --- | --- | --- |
|  | no | $\Delta\leftrightarrow$ |
| Optical Circuit 2    no | no | $\Delta X$ |
| $\Delta\leftrightarrow$ | $\Delta Z$ | $\Delta$azimuth |

If only optical circuit 1 observes a lateral movement, it can be concluded there was a translation of the head along the X-axis. In case only optical circuit 2 observes a left/right displacement, the head must have moved along the Z-axis.

In an aspect the present invention also relates to a headrest for a seat in a car, train, aeroplane or other vehicle. A seat headrest typically has a front surface configured to face towards the (back of the) head of a user sat in the seat, and a back surface configured to face away from the head of a user sat in the seat. The head tracking system as previously described can advantageously be applied in such a seat headrest.

The seat could also be a seat for use outside a vehicle. For example, the seat could be a seat for a computer game player, a seat for use in studio monitoring or a personal home cinema seat, but is not limited thereto. Other application fields can be a studio monitoring application, etc. . . . or even just personal listening to music.

In such a headrest the at least one optical circuit is preferably integrated in the front surface of the headrest. Preferably there is at least one optical circuit of the head tracking system that faces the back of the user's head, so that the head is readily visible during use and position of the head can be determined.

In another embodiment with one optical circuit in the head tracking system the single optical circuit may also be positioned in the headrest so that it faces one of the ears of the user.

In an embodiment with more than one optical circuit there is advantageously one optical circuit that faces the back of the user's head, and one optical circuit positioned to face one of the ears of the user.

In an aspect the invention is related to a system comprising the head tracking system as set out above and at least two loudspeakers. In an advantageous embodiment such a system is comprised in a headrest of a seat as previously described. Hence, in such case not only the head tracking system is integrated in the headrest but also at least two loudspeakers. Since a typical headrest is designed to be a small distance (e.g. 30 cm or less) from the ears of a user who is sitting down in a seat, this is a convenient way of configuring the seat so that a comfortable listening position is created for a user who is sat down in the seat.

Figure 5:
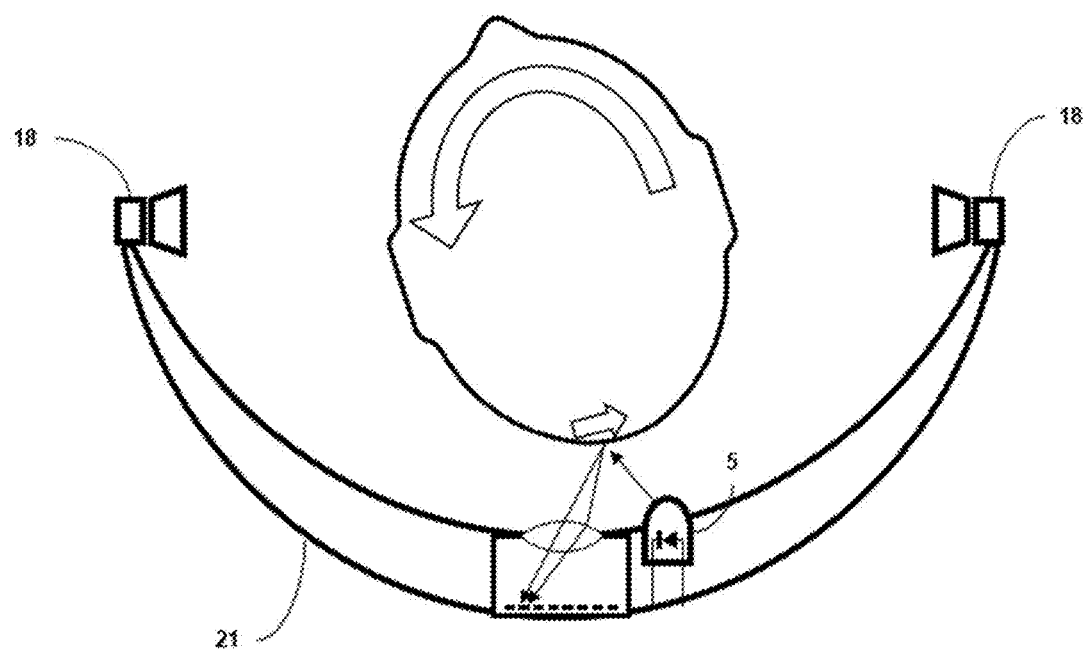
FIG. 5 illustrates an embodiment of a headrest provided with a head tracking system and two loudspeakers.

An advantageous embodiment of a headrest (9) provided with a head tracking system and further comprising two loudspeakers (18) is shown in FIG. 5. The embodiment of the system depicted in FIG. 5 also comprises a light source (5). In order not to overload the figure a head tracking system with one optical circuit (2) is shown. Obviously, embodiments with more than one optical circuit can be envisaged as well.

Figure 6:
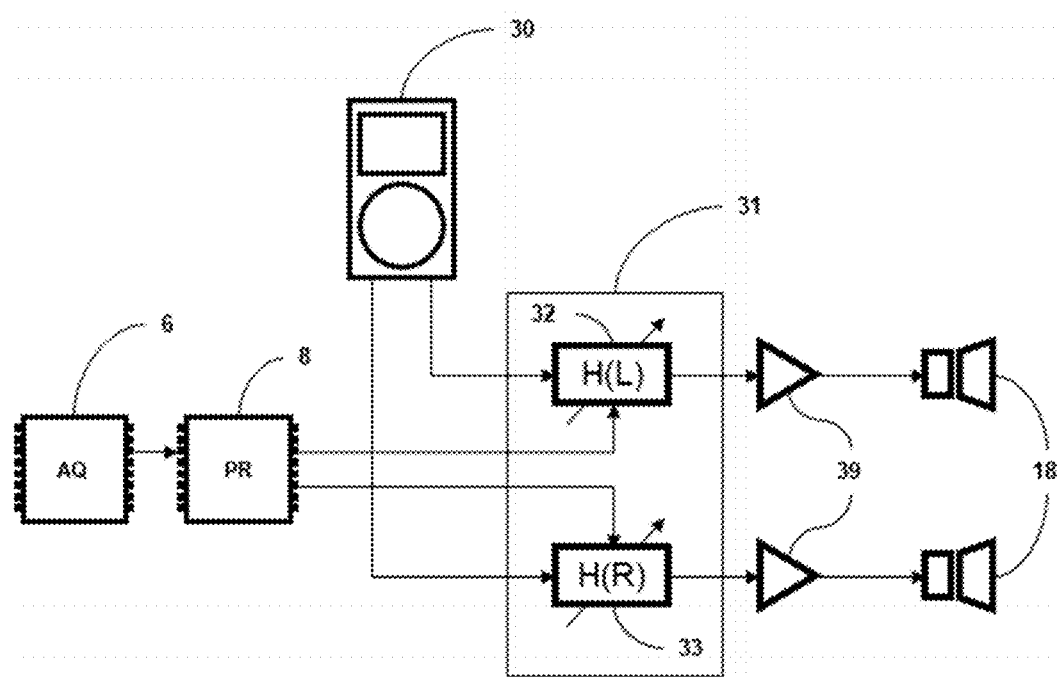
FIG. 6 illustrates an exemplary implementation of the scheme of the headrest with a head tracking system and two loudspeakers as shown in FIG. 5.

In FIG. 6 a set-up is illustrated whereby the processing unit (8) of the head tracking system is connected to a further digital signal processor (31) that receives stereo sound from a music source (30). The two music channels and the information concerning head movement coming from the processing unit of the head tracking system are fed to that further digital signal processor to adjust parameters to contribute to an enhanced listening experience. Said further digital signal processor feeds its output signal to the audio amplifiers which each output an amplified signal to the loudspeakers.

In case of an implementation of the head tracking system with loudspeakers built in in a headrest of a vehicle seat, an attractive arrangement could be to have the one or more optical circuits, the acquisition circuit and the processing unit integrated in a first device and the digital processor for the audio signals as another device. The displacement vectors are calculated in that first device and may be conveyed to the audio processor via a logical bus, e.g. a Controller Area Network (CAN) bus. Another option could be to have the one or more optical circuits and the acquisition circuit forming a first device and the processing unit and the digital processor for the audio signals as the other device. In such case the frames output by the acquisition unit are transported via a bus. This could be based e.g. on link technology enabling the transport of the frames over unshielded twisted pair (UTP) cables.

Considering more in detail FIG. 6. the processing unit (8) is shown which receives from the acquisition circuit (6) a frame derived from the sensor output signals and determines in the way set out above the set of displacement vectors. The displacement vectors are forwarded to the further digital signal processor (31). Input signals (e.g. music signals from a stereo source (30)) are fed into separate variable filters (32,33) comprised in the further digital signal processor for a left channel and a right channel, respectively. The displacement vectors are used to adjust one or more processing parameters for the sound channels. The transfer function of the variable filters can be adjusted (e.g. in magnitude, phase, delay) using the correction signals derived from the displacement vectors. This adaptation can be performed e.g. at the same rate that displacement vectors are generated. In this way the filter transfer function can be adapted according to the most recent values of the displacement vectors. The variable filter outputs are then applied to audio amplifiers (39) and the amplified signals go to the respective loudspeakers (18) in the headrest. One loudspeaker faces the left ear and the other loudspeaker faces the right ear of the listener, as illustrated in FIG. 5.

In FIG. 5 a situation is sketched where the listener turns the head to the left (i.e. around the azimuth axis). This movement is detected by the sensor array in the optical circuit, e.g. a one-dimensional array as illustrated. A corresponding frame is derived. Comparison of the frame with an earlier frame yields a non-zero displacement vector. As set out above, this can be found even with a set-up with only one optical circuit as in FIG. 5. The further digital signal processor (31) receives this displacement vector and determines an updated correction signal value for both the left and the right channel. In this particular example the correction signal for the left channel may be slightly decreased in amplitude compared to its value before the movement and the correction signal for the right channel is slightly increased.

In an advantageous embodiment the processing unit (8) of the head tracking system and the further digital processor (31) that takes care of the acoustic virtualization are integrated in one digital processing component. In such embodiment that single digital processing component receives the frames derived from the sensor output signals and determines displacement vectors. The digital processing component then computes adjusted correction signals and applies them to the respective variable filters. The resulting signals are after D/A conversion next output via the amplifiers to the loudspeakers.

Figure 7:
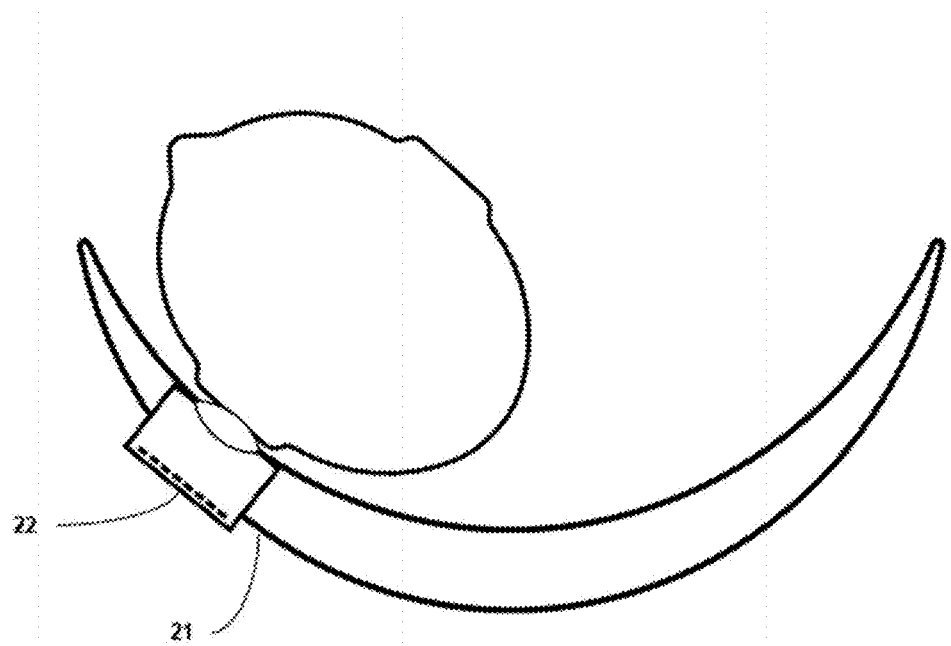
FIG. 7 illustrates an embodiment wherein the optical circuit of the head tracking system is positioned to allow detection of a rest or sleep mode.

The headrest may obviously also be used for resting or sleeping. The processing unit of the head tracking system is in certain embodiments arranged to detect such a situation. In the embodiment illustrated in FIG. 7 the optical circuit (2) is so positioned in the headrest (9) that when the user is resting or sleeping, the optical circuit is completely or partially blocked, i.e. the reflected light is not or not fully captured anymore by the sensors of the optical circuit. Hence, the measured total intensity of reflected light received by the sensors drops below a given threshold level. This change of state can be detected. For example, the optical circuit may be arranged to detect a drop of the amount of reflected light below a certain level. Alternatively, the acquisition unit may be equipped to detect the incoming signal from the sensors is below a threshold level. The head tracking system may be such that its processing unit can detect the received frames are 'too dark'. The head tracking system can then be put in a rest or sleep mode.

In advantageous embodiments the detection of being in a rest or sleep mode can be linked to taking measures related to safety enhancement and/or comfort enhancement. For example, the music stream can be paused when in rest or sleep mode. Alternatively, only the volume of the music signals may be lowered or the sound may be modified. In other embodiments the detection of the rest or sleep mode may be a trigger to adapt one or more filter settings for an algorithm for noise cancellation.

In yet other embodiments the detection of the rest or sleep mode may be an indication that a reading light can be dimmed or switched off.

Another interesting feature of a head tracking system in a headrest may be that a warning signal is launched when a rest or sleep mode is detected in the headrest of the driver's seat.

The detection of a rest or sleep mode may also be used to put the whole head tracking system in a reduced power mode.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A head tracking system for use in a headrest, comprising:
   at least one optical circuit comprising a plurality of sensors, each sensor arranged to detect light reflected from at least portion of an illuminated scene, said portion of said scene containing at least a part of a head to be tracked, and to provide an output signal corresponding to an amount of reflected light detected by the sensor,
   an acquisition circuit arranged to receive a plurality of output signals from said plurality of sensors and to derive a frame from said output signals,
   a processing unit arranged to receive said frame, to determine one or more displacement vectors by comparing the received frame with one or more frames obtained at a different moment in time and computing a cross-correlation between the received frame and the one or more frames, and to derive an indication of a change in position and/or orientation of the head based on the one or more displacement vectors.

2. The head tracking system according to claim 1, wherein said plurality of sensors forms a two-dimensional array.

3. The head tracking system according to claim 1, comprising a light source to illuminate at least said portion of said scene.

4. The head tracking system according to claim 3, wherein light source is configured to emit light at one or more intensities and/or one or more wavelengths.

5. The head tracking system according to claim 3, wherein said one or more wavelengths are in the infrared light spectrum.

6. A system comprising a head tracking system according to claim 1 and at least two loudspeakers, said system being arranged to adjust at least one parameter setting of signals applied to said loudspeakers based on said indication of said change in position and/or orientation of the head.

7. The system according to claim 6, arranged to adjust in magnitude and/or phase and/or delay said signals applied to said loudspeakers.

8. A headrest equipped with a head tracking system according claim 1.

9. The headrest according to claim 8, wherein an optical circuit of said at least one optical circuit is so positioned that it faces the back of said head.

10. The headrest according to claim 8, wherein an optical circuit of said at least one optical circuit is so positioned that it faces an ear of a user.

11. The headrest according to claim 8, further comprising at least two loudspeakers and arranged to adjust at least one parameter setting of said loudspeakers based on said indication of said change in position and/or orientation of the head.

12. The headrest according to claim 8, wherein said processing unit is arranged for calculating said at least one parameter setting to be adjusted.

13. The headrest according to claim 8, arranged to detect that the total amount of reflected light captured by said sensors drops below a given threshold level.

14. A seat wherein a headrest according to claim 8 is integrated.

* * * * *